(12) United States Patent
Dulaney et al.

(10) Patent No.: US 6,683,976 B2
(45) Date of Patent: *Jan. 27, 2004

(54) IMAGE PROCESSING FOR LASER SHOCK PROCESSING

(75) Inventors: Jeffrey L. Dulaney, Dublin, OH (US); Mark E. O'Loughlin, Galloway, OH (US); Allan H. Clauer, Worthington, OH (US)

(73) Assignee: LSP Technologies, Inc., Dublin, OH (US)

(*) Notice: Subject to any disclaimer, the term of this patent is extended or adjusted under 35 U.S.C. 154(b) by 96 days.

This patent is subject to a terminal disclaimer.

(21) Appl. No.: 09/846,494

(22) Filed: Apr. 30, 2001

(65) Prior Publication Data

US 2002/0021831 A1 Feb. 21, 2002

Related U.S. Application Data

(63) Continuation of application No. 09/057,107, filed on Apr. 8, 1998, now Pat. No. 6,292,584.

(51) Int. Cl.[7] .............................. G06K 9/00; B23K 26/00
(52) U.S. Cl. .................................. 382/151; 219/121.85
(58) Field of Search ................................ 382/141, 145, 382/148, 149, 151–153; 219/121.84, 121.6, 121.68, 121.85, 121.73

(56) References Cited

U.S. PATENT DOCUMENTS

| | | | |
|---|---|---|---|
| 4,616,121 A | 10/1986 | Clocksin et al. | 219/124.34 |
| 4,937,421 A | 6/1990 | Ortiz, Jr. et al. | 219/121.68 |
| 5,115,115 A | 5/1992 | Alborante | 219/121.63 |
| 5,493,093 A | 2/1996 | Cecil | 219/110 |
| 5,517,420 A | 5/1996 | Kinsman et al. | 700/166 |
| 5,935,464 A | 8/1999 | Dulaney et al. | 219/121.65 |
| 6,292,584 B1 * | 9/2001 | Dulaney et al. | 382/151 |

* cited by examiner

*Primary Examiner*—Leo Boudreau
*Assistant Examiner*—Duy M. Dang
(74) *Attorney, Agent, or Firm*—Randall J. Knuth

(57) ABSTRACT

An image processing system for monitoring a laser peening process includes a laser peening system having a workpiece positioner and a system controller. A video camera is utilized for forming an electronic image of at least a portion of a workpiece. An image processing computer is connected to the video camera, and the laser peening controller includes a program to determine a position of the workpiece.

26 Claims, 4 Drawing Sheets

SIDE 1

SIDE 2

IMAGE PROCESSING FOR LASER SHOCK PROCESSING

This is a continuation of patent application Ser. No. 09/057,107 filed on Apr. 8, 1998, U.S. Pat. No. 6,292,584 the disclosure of which is herein explicitly incorporated by reference.

BACKGROUND OF THE INVENTION

1. Field of the Invention

The present invention relates to the use of coherent energy processes for high powered pulse lasers, in the shock processing of solid materials, and more particularly, to methods and apparatuses to accurately control the laser peening process (i.e., the laser shock process) in a production environment.

2. Description of the Related Art

Known methods of shock processing solid materials and particularly laser shock processing solid materials using coherent energy, as from a laser, orient the laser beam normal, i.e., perpendicular, to the workpiece.

Particular constraints of laser processing are formed based on the shape of material or other geometric factors such as, attempting to laser shock harden integrally bladed rotors (IBRs), blind bores, slots, or dove-tailed sections. The laser beam utilized may not have a direct line-on-sight access to the area to be shock processed. Laser shock processing techniques and equipment can be found in U.S. Pat. No. 5,131,957 to Epstein.

Production problems occur with the placement and location of the workpiece to be processed. Particular pieces of information such as knowing the present and actual location of the workpiece, along with determining whether the laser shock processing system has hit the workpiece where the control program has instructed the laser to do so are important to part quality and reproducibility of results.

What is needed in the art is an automatic system for determining and controlling laser shock process variables.

SUMMARY OF THE INVENTION

According to the present invention, the laser shock system utilizes a computerized system for identifying that a workpiece is in a correct placement attitude, and that the laser shock processed operation was conducted at a correct location on the workpiece.

The invention, in one form thereof, is that of a tool fixture, to hold the workpiece to be worked (i.e., laser shock processed). Based upon particular physical characteristics of the tool fixture, the present invention and system can readily identify the location of the fixture based upon reference or locator spots thereon.

A laser processing environment may contain conditions where visibility, at least to the visible light spectrum, may be diminished. The system can also utilize and target areas on the fixture by reference spots, reflectors, LEDs, or other types of indicators, for location within the process environment.

Additionally, positioning encoders may be affixed with the fixture movement means to identify the location of the fixture and workpiece at all times. Such position encoders would actually be just initial or absolute reference markers, since there would still be a need for measuring a reference mark for error trapping and system feedback control.

Another feature of the present invention is that the system can identify, via a number of different means, the focus or angle of the beam shot, and triangulate same from distance calculation based upon the tool fixture reference spots. Such identification can determine whether or not the laser beam moves out of a particular range, thereby causing the laser shock processing system to stop processing and alert the operator, or to utilize such data to automatically re-align the workpiece on the laser beam. In the most preferred case, the absolute location of the laser spot shall stay substantially immovable, while the tool fixture and workpiece are moved to reposition the laser spot on the workpiece.

Yet another feature of the present invention is that of using a video camera to capture the location of the workpiece and fixture. Utilizing image-grabbing software, along with filters to prevent burn out of the video camera, the system may measure the location of the tool fixture at one or more different frequencies to store and analyze data regarding the laser shock processed spot or beam reflection. Additionally, the imaging system of the present invention utilizing a video camera, may be able to detect whether or not a sufficient plasma has formed during the laser shock processing operation to sufficiently work the workpiece. Additionally, the video camera can be used to detect whether or not the transparent overlay utilized in a laser shock processing operations system has been properly created.

Other variables of the laser shock processing system may be determined by the inventional imaging system such as, whether or not there is any transparent or opaque overlay applied to the workpiece, and determining whether or not the proper laser spot size was applied to the workpiece. Of course, other variables may be detected and utilized such as, whether or not the opaque overlay was correctly placed and are of the correct thickness.

The video imaging aspect of the present invention utilizes elements to ensure capture of the laser beam to prevent ghosts and other spurious signals in the digitized data stream. In one aspect of the invention, the digital camera is synchronized to the frame rate and/or the speed of the laser beam. If the camera frame rate is not synchronized to the laser, the camera may observe a portion of the laser spot on more than one frame.

The invention, in one form thereof, is an image processing system for monitoring a laser shock process. The processing system includes a laser shock processing system having a workpiece positioner and a laser shock process system controller, a video camera for forming an electronic image of at least a portion of the workpiece, and an image processing computer connected to the video camera and the laser shock processing controller, the image processing computer including a program to determine a position f the workpiece.

The invention, in another form thereof, is an image processing system comprising a laser shock processing system for creating a laser spot on the workpiece. The laser shock processing system has both a workpiece positioner and a system controller. A video camera is included for forming an electronic image of at least a portion of the workpiece. An image processing computer is connected to the video camera and the laser shock processing controller, image processing computer including a program to determine the laser spot size on the workpiece during laser shock processing.

The invention, in yet another form thereof, comprises a laser shock processing system having both a workpiece positioner and a laser shock processing system controller, a video camera for forming an electronic image of at least a portion of the workpiece, and an image processing computer connected to the video camera and the laser shock processing controller, the image processing computer including a program to determine the position of the laser spot on the workpiece during laser shock processing.

The invention, in still another form thereof, is an image processing system for monitoring a laser shock process utilizing overlays. The image processing system includes a laser shock processing system having both a workpiece positioner and a system controller, along with a video camera for forming an electronic image of at least a portion for the workpiece. An image processing computer connected to the video camera and the laser shock processing controller includes a problem to determine if one of the laser shock processing process overlays is applied correctly to the workpiece during laser shock processing.

The invention, in another form thereof, is a method of controlling a laser shock processing system utilizing dual-sided processing. The method comprises the steps of applying a laser beam to opposite sides of a workpiece, determining the size of the laser spots on each side of the workpiece via an image processing system, and adjusting at least one of the laser spot sizes to then crate a substantially equal sized laser spot on each side of the workpiece.

In still another form, the invention includes a method of controlling laser shock processing system utilizing dual-sided processing. The method comprises the steps of applying a laser beam to opposite sides of a workpiece, determining the position of the laser spots on each side of the workpiece via an image processing system and adjusting at least one of the laser spot positions to provide laser spots on opposite sides of the workpiece which are substantially concentric with each other along a line through the workpiece.

In yet another form, the invention includes a method of controlling a laser shock processing system utilizing dual-sided processing. The method comprises the steps of applying a laser beam to opposite side of a workpiece, determining the position and size of the laser spots on each side of said workpiece via an image processing system, and adjusting at least one of the laser bemas such that the shock waves generated on substantially opposite sides of the workpiece substantially overlap each other as they pass through the workpiece.

The invention, in still another form thereof, comprises an image processing system for use with a laser shock processing system having a workpiece positioner and controller which communicate together passing information encoding a position of a workpiece. The image processing system includes a video camera for forming an electronic image of the workpiece and a programmed image processing computer connected to the video camera and laser shock processing system controller. The computer is programmed to determine a calculated position of the workpiece based upon the electronic image. The computer determines the difference between the calculated position and the encoded position and sends a signal to the laser shock processing controller system if the difference is greater than a predetermined range.

The invention, in another form thereof, comprises an image processing system for use with a laser shock processing system for creating a laser spot of a particular size on a workpiece. The image processing system includes a video camera for forming an electronic image of at least a portion of the workpiece, and a programmed image processing computer connected to the video camera and laser shock processing system. The computer is programmed to calculate the size of the laser spot by operations on the electronic image. The computer then sends a signal to the laser shock processing system if the calculated spot size is outside of a predetermined range.

The invention, in yet another form thereof, comprises an image processing system for use with a laser shock processing system having an opaque overlay applicator to apply opaque overlay to a workpiece. The image processing system includes a video camera for forming an electronic image of the workpiece and a programmed image processing computer connected to the video camera and laser shock processing system. The computer determined from the electronic image whether the laser shock processing system actually applied the opaque overlay and sends a signal to the laser shock processing system in the event that the computer determined that no opaque overlay was applied.

The invention, in another form, comprises a method of controlling a laser shock processing system utilizing dual-sided processing. The method includes the steps of applying a laser beam to opposite sides of a workpiece, determining the size of the spots on each side of the workpiece created from the laser beams with a video camera, and providing a means to adjust at least one of the spot sizes to then create the same sized spot on each side of the workpiece on a subsequent laser beam impact.

The invention, in another form thereof, comprises a method of controlling a laser shock processing system having a workpiece positioner and a system controller. The method includes the steps of applying an opaque overlay to the workpiece over a first are to be laser shock processed, applying a laser beam to a spot on the opaque overlay at the first area, repositioning the workpiece, and determining the integrity of the opaque overlay at a second area to be laser shock processed using an image processing system the second area adjacent to the first area.

An advantage of the present invention, in one form thereof, provides an automatic process to increase the laser shock process work speed in a production environment.

Another advantage of the present invention is that of increased quality control to determine whether processing conditions meet specifications to ensure that the workpiece is sufficiently laser shock processed for intended application.

A further advantage of the invention, in one form thereof, provides a system able to replicate the laser shock process and to analyze the process in a production environment, and thereby reduce production variations. The system makes processing consistent and repetitive across different laser shock processing hits and different laser shock processed parts.

Another advantage of the present invention is that of enabling replicate processing on different parts. By controlling and observing all variables in the laser shock processing system, repetitive processing with a high degree of repeatability and standardization is possible.

Yet another advantage of the present invention, is that based upon the high value of workpieces such as gas turbine engine blades, on which the newly created imaging system may operate, waste of high-valued workpieces is reduced.

Still another advantage of the present invention, is that it operates in a superior fashion over conventional position encoding of particular gripper or robot arms. The present imaging system gives direct feedback to inform the operator that the laser shock processing system is definitely hitting the spot that it is programmed to hit. Programming a robot to move workpieces in a particular direction does not let you know if the mirrors of the laser are out of alignment, or if the workpiece has moved in the fixture.

Another advantage of the present invention is the ability to determine whether or not the opaque overlay has been applied to the workpiece, thereby preventing scorching of the workpiece surface during laser shock processing.

Another advantage of the present system is creating an automatic alignment technique for double-sided processing of workpieces. Additionally, real time checking of the spot position and spot size is possible during the laser shock processing operation.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
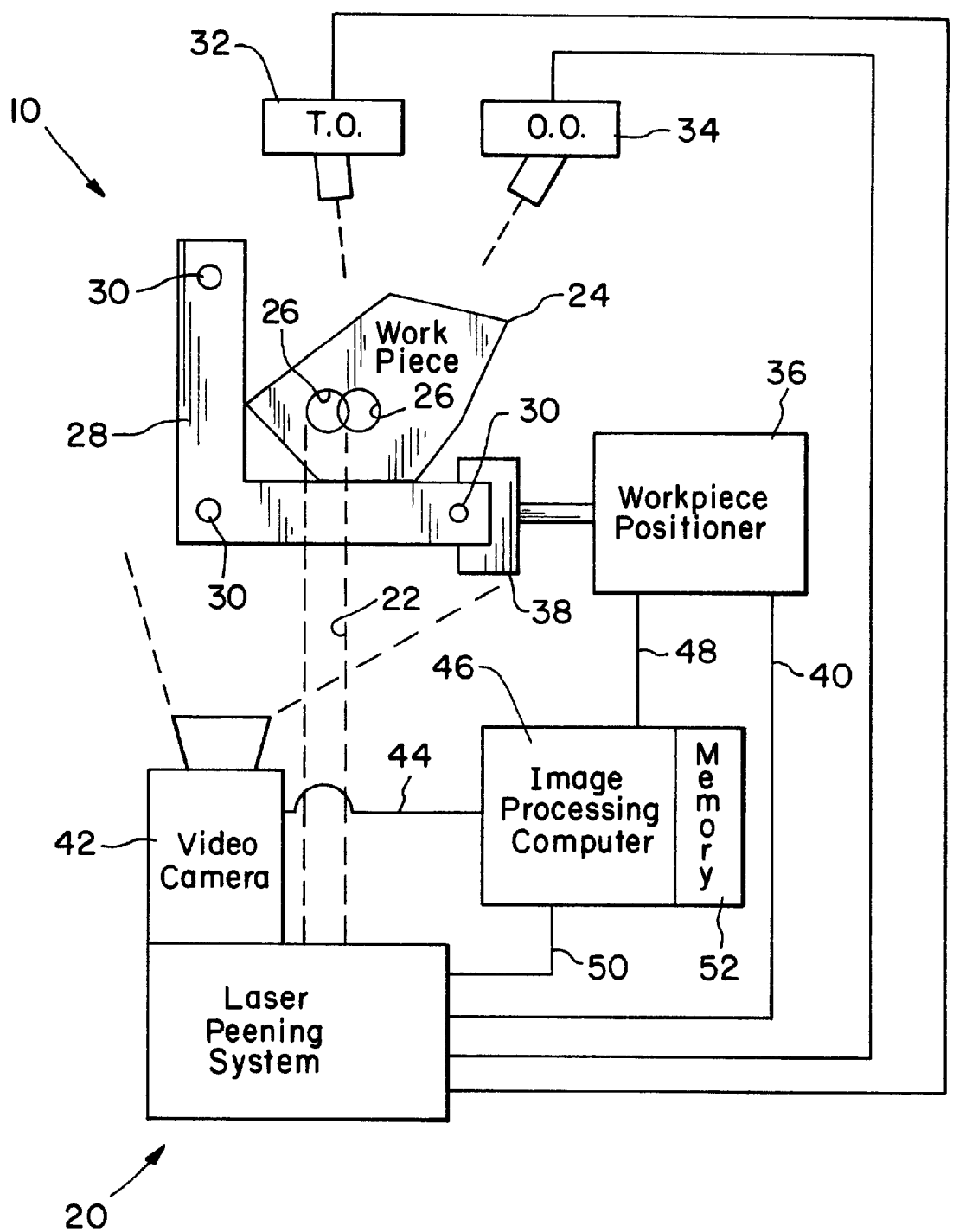
FIG. 1 is a diagrammatic view of the present invention showing an interconnection to a laser shock processing system.

Referring now to the drawings, and particularly to FIG. 1, there is shown an image processing system 10 of the present invention. Image processing system 10 operates in conjunction with a laser shock processing system 20. Laser shock processing system 20, as known in the art, develops a laser beam 22 for laser shock processing or laser peening a workpiece 24. As shown in FIG. 1, the shock processing by beam 22 produces a laser spot 26 on workpiece 24. Workpiece 24 is held within a tool fixture 28 to be further described herein. The prime importance on tool fixture 28 is to locate the workpiece by reference marks 30, whose function will also be described herein.

Laser shock processing system 20 further includes a transparent overlay applicator 32 for applying a transparent overlay material, such as water. Also connected to laser shock processing system 20 is an opaque overlay applicator 34 for supplying conventional opaque overlay materials such as tape, or, more preferably, black paint. A workpiece positioner 36 with a movable gripper element 38, selectively attaches to tool fixture 28 to move both fixture 28 and workpiece 24. Workpiece positioner 36 is connected to the laser shock processing system via a data line 40. Such data line 40 can cause control signals to pass from a laser shock processing system control 20 to operate the workpiece positioner 36 and actuate the gripper element 38 for proper positioning of tool fixture 28 and workpiece 24. Additionally, control line 40 allows encoded positioning information to be transmitted back from the workpiece positioner 36 to the laser shock processing system 20.

The present invention of the image processing system 10, includes the use of a video imaging means, such as a video camera 42 connected by a data line 44 to an image processing computer 46. Image processing computer 46 is preferably separate but may be located integrally with laser shock processing system 20. The image processing computer is further connected via a data line 48 to a workpiece positioner 36. Data line 48 is utilized to obtain the relative position of gripper element 38. Alternatively, the image processing computer may obtain such encoded workpiece position location via a data line between image processing computer 46 and laser shock processing system 20 via a data/control line 50. Image processing computer 46 includes memory 52 for storage of particular workpiece positions, control programs, and data masks.

In general, the imaging processing system 10 of the present invention, will determine whether laser shock processing system 20 is hitting the proper location on workpiece 24 via the use of video imaging software. An image is captured at various times during the laser peening process by a video camera 42. Such video information is transmitted to the image processing computer by data line 44.

Particular imaging software which may be used by the image processing computer may include particular personal computer or other computer based systems on which imaging processing may occur. Preferably, the imaging software package utilizes an application program called Inspector, available from Matrox Duvall, Quebec, Canada, may be used with a Windows™ operating system. Such package can interactively apply imaging logarithm to image analysis and machine vision tasks. Other available programming systems include a software system called MVTools from Imagining Technology, Inc., of Belford, Mass., which system comprises a library of machine vision functions including point at area processing, convolution, morphology, edge finding and measurement, and point-to-point distance measuring functions. Similar types of software packages include Image Pro Plus 3.0, an image analysis package that enables developers to control and automate image generating laboratory equipment (available from Media Cybernetics of Silver Spring, Md.) and Xcaliper 4, an object oriented machine vision tool running on a Windows™ operating platform, which object oriented program is available from Optimis, Inc. from Bothell, Wash.

Image processing computer may be that of a dedicated microprocessor, or a conventional computer system such as a Pentium-based computer utilizing a conventional operating system. Software is used to process the image received from video camera 42 to determine whether or not workpiece 24 is in the proper location.

Utilizing the above referenced imaging software on conventional computing systems such as Pentium based personal computers, the imaging software can determine whether the workpiece is in the proper position using, for example, edge finding technologies. In this case, the edge of the workpiece may be determined using the machine vision system, and compared against the target values stored in the controller.

Additionally, based upon the timing of the capture of the video image, the location of the laser spot 26 may be obtained. Furthermore, by correctly timing the video capture of the image with video camera 42, the proper application of the transparent overlay applicator 32 along with the application of the opaque overlay applicator 34 may be determined.

The application the opaque overlay can be determined by comparing a capture video image of the opaque spot sized shape to a set of predetermined metrics stored in the controller. Proper application of the transparent overlay can be confirmed by comparing video images of the workpiece taken before and after the application transparent overlay.

Figure 3:
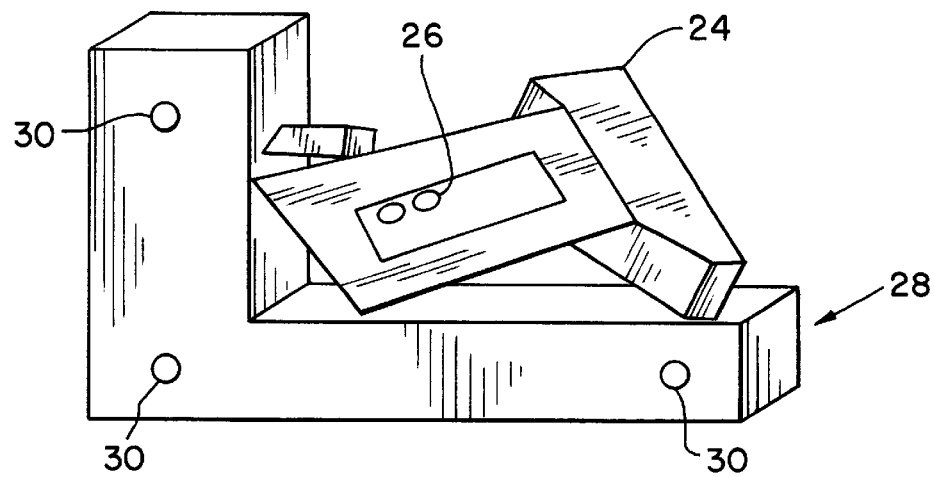
FIG. 3 is one embodiment of the workpiece holding fixture of the present invention.

In terms of determining whether or not workpiece 24 is in the proper location, the image from video camera 42 shall be processed. As shown in FIGS. 1 and 3, tool fixture 28 is supplied with reference marks 30. Software loaded within image processing computer 46 will triangulate the position of reference marks 30 to determine whether the orientation of workpiece 24 is proper.

The image processing system can be programmed for the correct reference marks either by using the reference piece and collecting a base line video image or by mathematically predicting the reference position of the piece. In these cases, the reference image would be compared against test image to validate the position of the workpiece.

Prior to operation of the image processing system 10 with actual laser shock processing system 20, various parameters shall be preselected and loaded into the memory 52, such as the correct reference locations for reference marks 30, along with a particular program that laser shock processing system 20 shall operate in terms of shock processing workpiece 24. Additionally, other information loaded into the memory 52 of image processing computer 46, includes a particular location of laser spots 26, and their pattern upon workpiece 24. With this predetermined information, image processing computer 46 will be able to identify out-of-bound conditions for laser shock processing system 20, along with out-of-position errors for laser shock processing spots 26, and out-of-position errors for workpiece 24 via reference to the tool fixture 28. Absolute positional reference for a period (perhaps daily check) or calibration for the workpiece holder position may also be used. For example, an LED embedded in the workpiece holder wall structure opposite the camera, at some distance that small movements (thermal, etc.) would be within acceptable background levels. Image processing computer 56 may use data obtained by triangulation of the reference marks 30 inputted through video camera 42 and compare those with the predetermined or required positions along with the encoded position information from the workpiece positioner 36.

Other features of the image processing computer can include a cross-check between the laser spot position 26 obtainable via video camera 42, if supplied with particular filters, in reference to either workpiece 24 and/or reference marks 30. Such filters may include optical attenuation and line filters that pass only one particular frequency of energy.

As laser shock processing system 20 operates, it creates a plurality of laser spots 26. On each (or a selected) laser shock processing operation, computer 46 will determine the position encoded by workpiece positioner 36 and the actual position as seen by video camera 42. Such system 10 is created to form a feed back loop such that the relative error in the position as seen by video camera 42, from the encoded position, may be passed to laser shock processing system via data/control line 50. In terms of other errors, or particular errors in which an out-of-bound condition for a predetermined laser shock processing variable is detected, a stop code may be passed down data control line 50 to cause laser shock processing system 20 to stop or prevent release of a laser beam 22.

Another feature of the image processing computer system 10 and program, is the ability to determine not just the relative position of workpiece 24 when operating correctly in conjunction with laser shock processing system 20, but that other aspects of the laser shock processing system 20 are also functioning properly.

During laser shock processing, an opaque overlay is applied via an applicator 34 to workpiece 24. Utilizing video camera 42, it is possible to observe and digitize an area of workpiece 24 area to which the opaque overlay is applied. Image processing computer 46 is able to determine whether or not the opaque overlay was applied to the predetermined area.

Additionally, just prior and during application of laser beam 22 to workpiece 24, a transparent overlay is applied to the workpiece 24. Depending on the particular timing and placement of the system, the transparent overlay, applied by a transparent overlay applicator 32, may be visualized by video camera 42. Such information may be processed by image processing computer 46 to ensure such transparent overlay material is applied. If, during processing, the transparent overlay material was not applied, a stop signal is sent via data/control line 50 to the laser shock processing system 20 to prevent laser beam 22 from being applied to workpiece 24.

Figure 2:
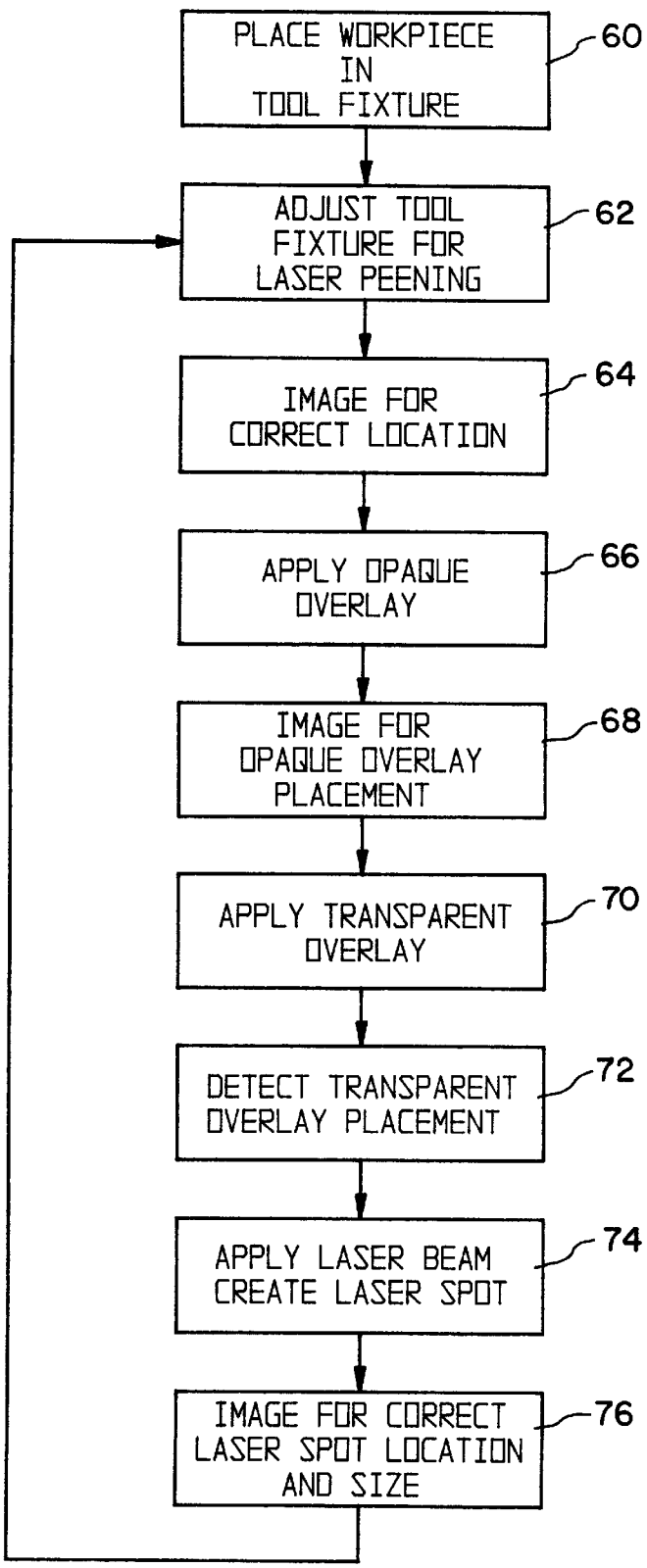
FIG. 2 is a flow chart of the main operation sequence of the present invention.

The method of the present invention for controlling laser shock processing system 20 via image processing, is shown in FIG. 2, starting when a workpiece is first placed in or attached to the referencing tool fixture 28 (60).

The next step in the method is to pre-adjust or adjust tool fixture 28 for laser shock processing. This would include the steps of the workpiece positioner 36 sending an initial or subsequent positioning signal via control line 40 to the laser shock processing system 20. Additionally, such the encoded position could be sent to the image processing computer 46 via data line 48 (62). With such initial reference location information an error deviation, if any, may be calculated.

After adjusting the tool fixture 28 relative to workpiece positioner 36 and gripper element 38, an image would be obtained via video camera 42 for imaging the location of tool fixture 28, which would thereby infer proper placement of workpiece 24. Preferably, system 10 would operate by triangulating the location the reference spots 30 and determining their position as compared to a predetermined correct position. Alternatively, other image processing techniques may be utilized to determine the position of workpiece 24 and tool fixture 28 either by edge processing or other video image processing that may become known to the art (64).

If the image processing computer 46 has determined that the workpiece 24 is in the proper location either by direct analysis of the image of workpiece 24, or by the image of tool fixture 28, a signal is sent from image processing computer 46 to the laser shock processing system 20 to apply the opaque overlay via the opaque overlay applicator 34 (66).

Image processing computer 46 will then obtain an updated image via video camera 42, the image for the opaque overlay placement (68).

On such correct placement, the image processing computer 46 may send a signal over the data/control line 50 to laser shock processing system 20 to apply a transparent overlay via a transparent overlay applicator 32 (70).

At this time an updated image will be obtained via video camera 42 and transmitted to image processing computer 46 to determine whether the transparent overlay is present (72).

On a true status that the transparent overlay is present, a signal or, an absence of a control signal, may be applied to laser shock processing system 20 to allow a laser beam 22 to be formed and applied to workpiece 24 to create laser spot 26 (74).

On such creation of laser spot 26, an updated image via video camera 42 will be obtained and processed to determine whether the laser spot 26 was applied in an appropriate predetermined location (76).

In a preferred system, the laser shock processing system 20 will then activate workpiece positioner 36 via control line 40 to reposition tool fixture 28 and thereby workpiece 24 into a new location according to a new preprogrammed arrangement for the placement of the laser spots 26 upon workpiece 24. At this time the laser imaging process steps will repeat with the adjusting step (62), and imaging processing will continue along with laser shock processing.

Figure 4:
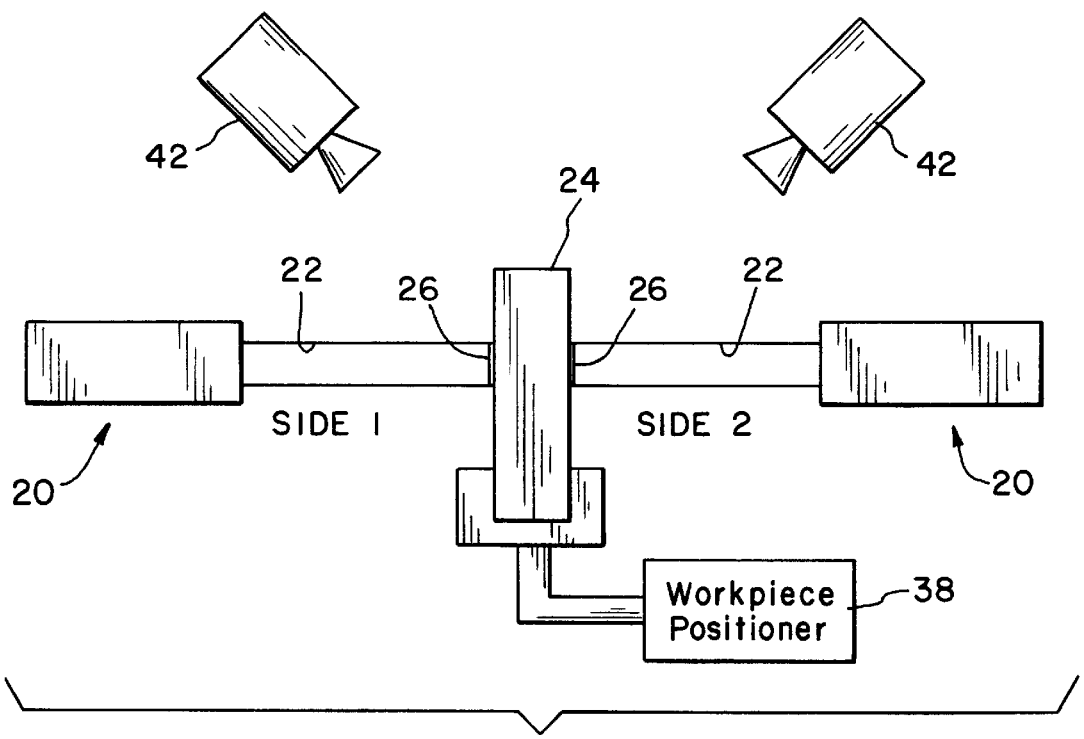
FIG. 4 is a diagrammatic view of one form of the present invention utilized in dual-beam processing.
Figure 5A:
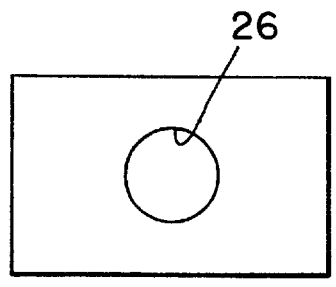
FIG. 5a is an enlarged diagrammatic view of a workpiece with laser spot after it has been correctly dual-beam laser shock processed.
Figure 5A:
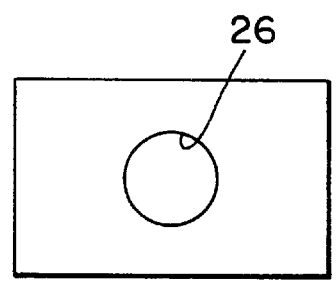

Another aspect of the invention, is that of the ability of system 10 to enable video checking of the laser beam 22 application for determining the position of workpiece 24 in dual-beam laser shock processing operation. As shown in FIG. 4, workpiece 24 has a laser beam 22 applied to opposite sides (side 1 and side 2). It is assumed that the laser beams 22 are of the same size on both side 1 and side 2, and that if the workpiece 24 is properly positioned between the laser shock peening systems, that the laser spot 26 developed on both sides of the workpiece 24 will be the same size, as shown in FIG. 5*a*.

Figure 5B:
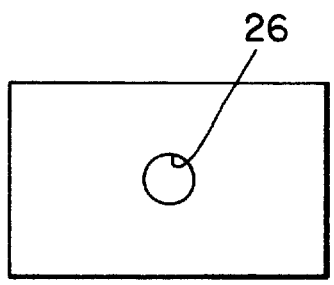
FIG. 5b is an enlarged diagrammatic view of a workpiece with laser spot after it has been dual-beam laser shock processed when there is an error in positioning of the workpiece.
Figure 5B:
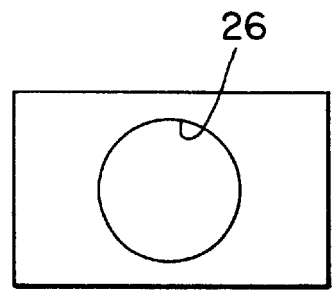

If there is an error in positioning or a possible error in a laser shock peening system 20, or a problem with optics transferring laser beam 22 to the workpiece 24, or in the possible event that workpiece 24 is improperly positioned, laser spots 26 on each side will be different, as shown in FIG. 5*b*. Such laser spots 26 will be visualized by video cameras 42, one video camera 42 per side. This feature on the present invention, in utilization with dual-beam laser shock processing operations, is vitally important, in that for particular thin parts such as air foils and the like, applications of the laser shock process must be coaxial; particularly, laser spots 26 must be directly on opposite sides of the workpiece, and that the spots also must have the same area.

Another embodiment of the system is the ability to compare spot location on both sides of the workpiece to ensure that they are coaxial. A periodic special check-off routine at the beginning of each workpiece may be made to insure system calibration.

Another embodiment of the present invention is that of a method utilizing imaging system 10 to verify that a pre-applied opaque layer is still intact from a previous laser shot, prior to applying a second, possibly adjacent, laser spot onto the workpiece. In this situation, such review of the opaque overlay a layer will allow continuous processing without utilizing the rapid processing technique shown in U.S. application Ser. No. 08/547,012, now U.S. Pat. No. 5,741,559, and hereby incorporated by reference.

In the current embodiment, workpiece positioner may position the workpiece for each adjacent spot in the laser shock processing pattern, rather than every second or third spot as is conventionally done. The incorporated patent application discusses a repetitive use of applying an opaque overlay between each firing of the laser beam. The current embodiment improves upon such system that if the opaque overlay at an adjacent spot is intact, no further application of an opaque overlay is utilized, but that only the laser beam fires to the adjacent spot after the workpiece positioner has moved the workpiece to the proper position. If the image processing system determines that such opaque overlay does not have the particular required integrity at the adjacent spot, the workpiece positioner will reposition the workpiece and fire the laser to a spot at a third area, which is not directly adjacent to the first area.

The integrity needed of the opaque overlay system, as determined by the image processing system, is such that the opaque overlay is sufficiently covering such investigated spot, and that the opaque overlay is intact or sufficiently covering the area provided for a sufficient laser shock processing operation. Without a sufficient opaque overlay at the laser shock processing spot, a sufficient laser shock operation may not result.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An image processing system for monitoring a laser shock process comprising;

a laser shock system having a workpiece positioner for positing a workpiece and a laser shock processing system controller, said laser shock system being configured for using laser energy to generate shock waves in the workpiece;

a video camera for forming an electronic image of at least a portion of said workpiece; and an image processing computer connected to said video camera and said laser shock processing controller, said image processing computer including a program to determine a position of said workpiece.

2. The image processing system of claim 1 in which said program sends a signal to said laser shock processing system controller with said workpiece positioning information.

3. The image processing system of claim 2 in which said position information is used to halt the laser shock processing of the workpiece if the position of said workpiece is determined to be outside of allowable tolerances.

4. The image processing system of claim 2 in which said position information is used to reposition the workpiece if the position of said workpiece is determined to be outside of allowable tolerances.

5. The image processing system of claim 1 in which said laser shock processing system controller and said image processing computer are the same.

6. An image processing system for monitoring a laser shock process comprising:

a laser shock processing system for creating a laser spot on the workpiece, said laser shock processing system having a workpiece positioner and a laser shock processing system controller, said laser shock processing system being configured for using laser energy to generate shock waves in the workpiece;

a video camera for forming an electronic image of at least a portion of said workpiece; and an image processing computer connected to said video camera and said laser shock processing controller, said image processing computer including a program to determine the laser spot size on the workpiece during laser shock processing.

7. The image processing system of claim 6 in which said program sends a signal to said laser shock shock processing system controller indicating said spot size information.

8. The image processing system of claim 7 in which said spot size information is used to halt the laser shock processing of the workpiece if the position of said workpiece is determined to be outside of a predetermined tolerance.

9. The image processing system of claim 7 in which said spot size information is used to adjust the spot size on the workpiece if said spot size is determined to be outside of allowable tolerances.

10. The image processing system of claim 9 in which said adjustment is made by repositioning the workpiece.

11. The image processing system of claim 9 in which said adjustment is made by repositioning a lens.

12. The image processing of claim 6 in which said laser shock processing system controller and said image processing computer are the same.

13. An image processing system for monitoring the laser shock process comprising:
  a laser shock processing system having both a workpiece positioner for positioning a workpiece and a laser shock processing system controller, said laser shock processing system being configured for using laser energy to generate shock waves in the workpiece;
  a video camera for forming an electronic image of at least a portion of said workpiece; and
  an image processing computer connected to said video camera and said laser shock processing system controller, said image processing computer including a program to determine the position of the laser spot on the workpiece during laser shock processing.

14. The image processing system of claim 13 further comprising said program sends a signal to said laser shock processing system controller with said laser spot position information.

15. The image processing system of claim 14 in which said laser spot position information is used to halt the laser shock processing of the workpiece if the position of said laser spot on said workpiece is determined to be outside of allowable tolerances.

16. The image processing system of claim 14 in which said laser spot position information is used to adjust the laser spot position on the workpiece if said laser spot position is determined to be outside of allowable tolerances.

17. The image processing system of claim 16 in which said adjustment is made by repositioning the workpiece.

18. The image processing system of claim 16 in which said adjustment is made by repositioning at least one of a lens and mirror.

19. The image processing system of claim 13 in which said laser shock processing system controller and said image processing computer are the same.

20. An image processing system for monitoring a laser shock process utilizing overlays, said image processing system comprising:
  a laser shock processing system having a workpiece positioner for positioning a workpiece and a laser shock processing system controller, said laser shock processing system being configured for using laser energy to generate shock waves in the workpiece;
  a video camera for forming an electronic image of at least a portion of said workpiece; and
  an image processing computer connected to said video camera and said laser shock processing controller includes a program to determine if one of the laser shock process overlays is applied correctly to said workpiece during laser shock processing.

21. The image processing system of claim 20 further comprising said program which sends a signal to said laser shock processing system controller with said laser shock process overlay information.

22. The image processing system of claim 21 in which said laser shock process overlay information is used to halt the laser shock processing of the workpiece if an overlay on said workpiece is determined to be outside of allowable tolerances.

23. The image processing system of claim 21 in which said laser shock process overlay information is used to reapply an overlay on the workpiece if a laser shock process overlay is determined to be outside of allowable tolerances.

24. The image processing system of claim 20 in which said laser shock process overlay is an opaque overlay.

25. The image processing system of claim 20 in which said laser shock process overlay is a transparent overlay.

26. The image processing system of claim 20 in which said laser shock processing system controller and said image processing computer are the same.

* * * * *